March 10, 1959

L. D. SACRE 2,877,351

TUNING MECHANISM

Filed July 12, 1954

4 Sheets-Sheet 1

INVENTOR.
Leo D. Sacre
BY Mueller & Aichele
Att'ys.

INVENTOR.
Leo D. Sacre,
BY
Mueller & Aichele
Atty's.

INVENTOR.
Leo D. Sacre,
BY
Mueller & Aichele
Att'ys.

March 10, 1959

L. D. SACRE 2,877,351

TUNING MECHANISM

Filed July 12, 1954

4 Sheets-Sheet 4

INVENTOR.
Leo D. Sacre,
BY
Mueller & Aichele
Attys.

2,877,351

TUNING MECHANISM

Leo D. Sacre, Prospect Heights, Ill., assignor to Motorola, Inc., Chicago, Ill., a corporation of Illinois Application July 12, 1954, Serial No. 442,651

19 Claims. (Cl. 250—40)

This invention relates generally to automatic tuners for radio receivers and the like and more particularly to a signal seeking tuner including an improved driving arrangement for providing automatic motor operation, push button selection, and manual operation.

Various automatic tuners have been provided for radio receivers to facilitate tuning the same automatically and/or remotely. Although push button arrangements have been used to permit simple selection of preset stations, these have disadvantages in certain applications. For example, radios provided in automobiles are often operated by the driver of the automobile and accordingly easy operation is required so that the driver's attention is not unduly diverted. Push button tuners have been used for this purpose and are generally satisfactory when the driver remains in a single area so that the stations in that area can be set up for push button selection. However, when driving in a different area, the push buttons must be reset to select stations in the new area and this operation requires considerable time.

Tuners have been developed and used which sweep through a frequency range seeking carrier waves in this range, and then stop when a strong carrier is received. Such tuners have generally included solenoids for pulling the tuning mechanism in one direction and springs for pulling the mechanism in the other direction. The solenoid is intermittently operated and draws heavy current which provides an objectionable load on the electrical system of the automobile in which it is installed. Further, such mechanisms have been complicated especially since provisions for manual tuning are desirable and in order to provide satisfactory manual tuning the automatic driving connections must be disengaged in some manner to release the load provided thereby. Further, the provision of push button facilities for selecting predetermined frequencies has complicated the automatic signal seeking tuner driving mechanisms.

It is therefore an object of the present invention to provide a simple and improved signal seeking tuner.

A further object is to provide a signal seeking tuner operating mechanism which stops accurately and quickly in response to a signal indicating the presence of a carrier wave.

A still further object of the invention is to provide a signal seeking tuner mechanism in which the motor driving mechanism is automatically disengaged when the tuner stops on a carrier to thereby permit easy manual tuning if desired.

Another object of the invention is to provide a signal seeking tuner having improved push button facilities for controlling the tuner so that carriers of predetermined frequencies only are selected thereby.

A feature of this invention is the provision of a signal seeking tuner including a motor for driving a tuning element through a gear train to provide a signal seeking operation, with the motor being stopped and reversed by a triggering circuit and the gear train disengaging itself to facilitate manual operation. The tuning element is disengaged from the gear train at the end of the range and returned by a spring for a successive sweeping operation by the motor.

Another feature of the invention is the provision of a signal seeking tuner system wherein a motor driving the tuning element through a gear is started by operation of a latching bar, with the motor being controlled by a relay which reverses the motor to disengage the gear train and then stop operation of the motor after a predetermined movement in the reverse direction. The gear train includes a shaft which moves axially in response to forward or reverse rotation of the motor to move interengaging projections to positions to make contact in the forward or tuning direction, or to clear each other in reverse direction.

A further feature of the invention is the provision of a radio receiver having a signal seeking tuner in which a portion of the receiver produces a triggering voltage to stop the seeking action, with the triggering portion being disabled by operation of any push button so that the triggering voltage is not produced, and then being activated when the tuner approaches a preset frequency so that the triggering voltage will be produced by a carrier adjacent this frequency. A simple structure is provided for activating the system only adjacent predetermined frequencies with the tuner being precisely stopped on the carrier frequency by the triggering action.

Further objects, features and the attending advantages of the invention will be apparent from a consideration of the following description when taken in connection with the accompanying drawings in which.

Figures 1, 2:
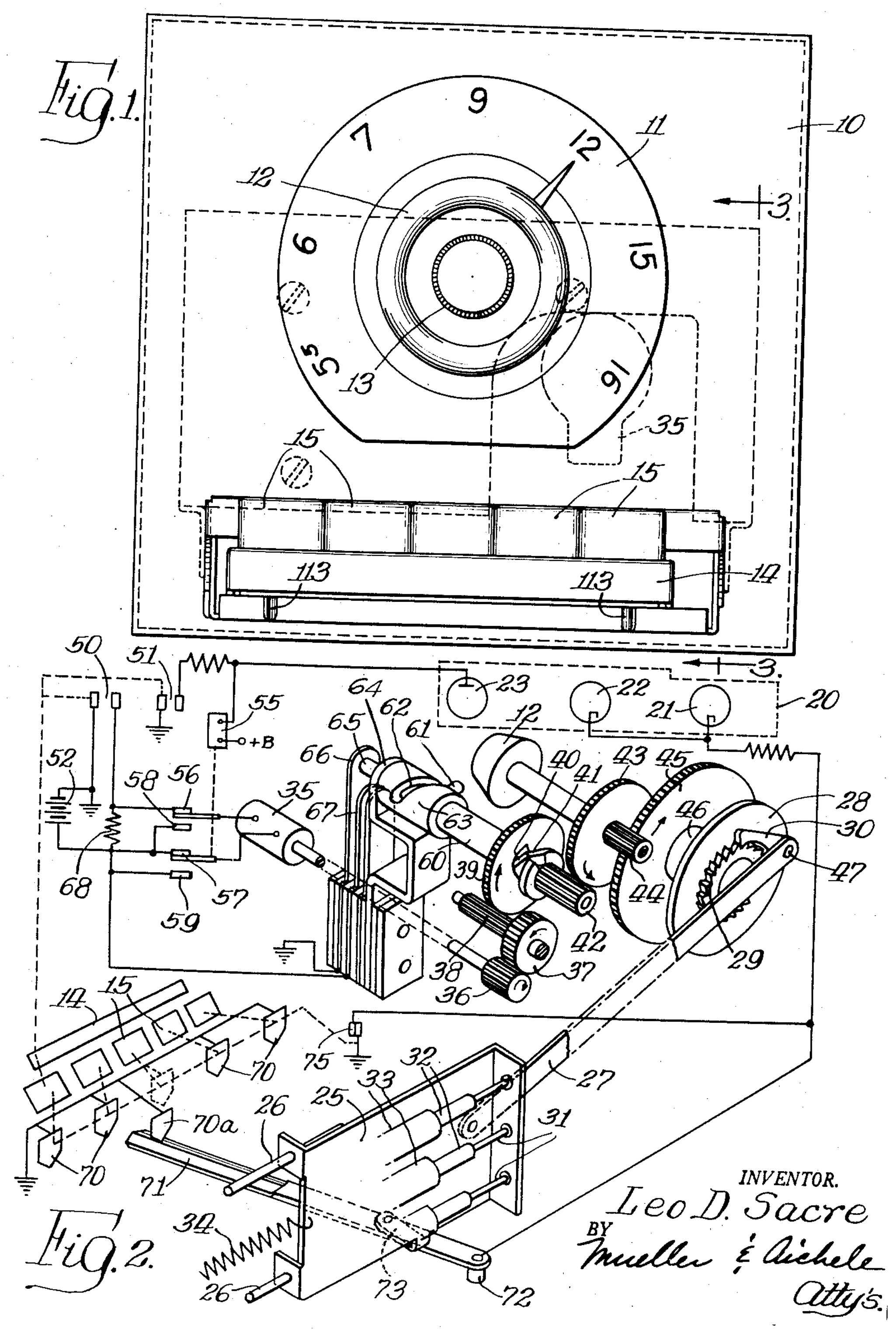
Fig. 1 is a front view of a tuner in accordance with the invention.
Fig. 2 is a schematic view illustrating the operating parts and electrical connections of the system.

In practicing the invention there is provided a sweep tuning system for a radio receiver which may include tuning elements of any type such as permeability tuned elements including cores movable into coils. The cores are provided on a carriage which is moved in a straight line manner, being moved in one direction through a gear and clutch structure and moved in the other direction by a spring. In accordance with the invention a motor is connected to a gear train for driving the tuner in the first direction. The motor is of the direct current type which may be reversed by reversing the polarity of the voltage applied thereto. The gear train includes a disengageable link for breaking the driving connection after each automatic tuning operation. The disengageable link is formed by a gear shaft having a pin positioned in a spiral slot, so that when the motor is reversed the shaft moves longitudinally and interengaging projections are moved to positions clear of each other. The longitudinal movement of the gear shaft also opens a switch after a predetermined reverse movement.

The tuning system is operated by a circuit which may include a portion of the radio receiver for producing a signal when the tuner reaches a carrier wave. Operation of the system is initiated by movement of a tuning bar which energizes the motor for rotation in the first direction with the connection being continued through the switch operated by the gear shaft referred to above. When a carrier wave is reached, the trigger voltage is applied through a relay which reverses the potential applied to the motor for reversing operation thereof. This breaks the driving connection through the gear train so that movement of the carriage is stopped, and after a predetermined reverse movement, the switch controlled by the gear shaft is opened to stop the motor. To provide a further automatic tuning operation the tuning bar may be again operated to energize the motor. The tuning bar also shorts the trigger relay so that it is released and the motor always starts in the first direction. A manual control knob and shaft may be coupled to the gear train between the disengageable link and the connection of the gear train to the carriage. Since the gear train is broken after each automatic tuning operation, manual tuning requires movement of only a portion of the gear train and thereby the torque required is minimized.

For push button operation, a plurality of units are provided each including a contact which can be spaced along supporting bars. An arm is moved by the carriage along the bars and is adapted to engage a contact when the supporting bar therefor is moved into an operating position by the associated push buttons. When any button is depressed, the motor is started as by operation of the tuning bar. The portion of the system for providing the trigger voltage is disabled so that the tuner will not stop in response to received carrier waves. However, when the arm connected to the carriage engages the contact associated with an operated push button, the trigger circuit is activated and as soon as a carrier is received the tuner will stop thereon in the manner described for automatic signal seeking operation.

Referring now to the drawings, in Fig. 1 there is shown a front view of the tuner in accordance with the invention. The tuner includes an escutcheon plate 10 on which there is provided a dial 11. A manual tuning control 12 is positioned at the center of the dial, and a volume control 13 may be provided on a shaft positioned as shown. At the bottom of the tuner there is provided a tuning bar 14 and a plurality of push buttons 15. As is apparent from Figure 3 the tuning bar extends further forward than the push buttons so that it may be easily actuated.

Fig. 2 illustrates schematically the circuit and structure of the improved sweep tuning system. Numeral 20 indicates the receiver proper, with tubes 21 and 22 representing R. F. and I. F. stages respectively, and tube 23 representing the output of a trigger circuit which provides current when a carrier is received. The movable carriage 25 is caused to reciprocate along rods 26, and is moved to the right by action of the link 27, and to the left by spring 34. The link 27 is connected at pivot 47 to disc 28 which moves freely on the shaft 46, and is rotated by action of teeth 29 and pawl 30. The pawl 30 is also pivoted to the disc 28 and releases when the carriage is at one end of its movement so that the carriage is returned by spring 34. Supported on the tuner frame are rods 31 which support cores 32 which are movable within fixed coils 33 (see Fig. 7). Accordingly, as the carriage moves the position of the cores 32 with respect to the coils 33 changes to vary the tuning of the receiver circuits. The tuning elements proper may be of standard design and do not constitute a part of the present invention.

For providing automatic operation of the tuner a motor 35 is provided which is directly connected to pinion 36. Pinion 36 drives gear 37 which is directly connected to pinion 38. Pinion 38 in turn drives gear 39 which has a projection 40 thereon engaging projection 41 which is directly connected to the pinion 42. Gear 39 and pinion 42 are independent and separately supported. Pinion 42 drives gear 43 and pinion 44 is connected to gear 43 and drives gear 45. Gear 45 is directly connected to the toothed wheel 29 through shaft 46 mentioned above.

As shown by the dotted lines, the tuning bar 14 is mechanically coupled to contacts 50 and 51 and closes the same when the bar is operated. Closing of contacts 50 applies the voltage from the potential supply means 52 to the motor 35 through closed contacts 56 and 57 of relay 55 which is operated by contacts 51. This causes operation of the motor to drive the gear 39 in a clockwise direction so that pinion 42 is likewise driven in a clockwise direction. When the tube 23 of the trigger circuit operates to de-energized relay 55, the contacts to the motor are reversed and connection is made through contacts 58 and 59. This causes the motor to reverse its direction so that the gear 39 rotates in a counterclockwise direction. It will be apparent that the projections 40 and 41 will disengage so that the pinion 42 will not be driven. Gear 39 is provided on a shaft 60 having a pin 61 projecting therefrom. This pin operates in a spiral slot 62 in sleeve 63. The sleeve 63 is held between the bracket 64 and mounting plate 80 (Fig. 7) and may rotate with respect thereto. However, when the gear 39 is driven backward, the pin 61 slides in the slot 62 which has only a slight angle with respect to a diameter of the sleeve 63, and movement of the pin 61 in the slot 62 produces only a slight tendency for the sleeve to rotate. Accordingly, the pin 61 slides in slot 62 and the shaft 60 will move to the left. This moves the projections 40 and 41 apart so that the gear train is broken.

Movement of the shaft 60 to the left resulting from reverse rotation of the motor 35 will cause the projection 65 which is connected to the shaft 60 to move switch arm 66 to the left so that contact thereof with contact 67 will be broken. This will break the circuit to the motor 35 so that the tuning operation will cease. It is to be pointed out, however, that if the latch bar 14 is held depressed, the motor 35 will continue to move in the forward direction even though contacts 66 and 67 are open. Contacts 51 closed by the tuning bar will take over from trigger tube 23 so that relay 55 is operated and the contacts thereof will remain in the position shown and the motor will rotate in a forward direction. A resistor 68 may be provided in the circuit between contact 67 and contact 56 so that rotation of the motor in the normal tuning operation will be slower than tha produced when the latch bar is actuated. Accordingly, the tuner may be moved from one frequency to another rapidly by the latch bar, but will move slower during normal tuning operation so that it will stop more quickly in response to a trigger voltage, and thereby provide more accurate setting of the tuner. When the relay 55 releases and the motor is connected to contacts 58 and 59 for reverse operation, the resistor 68 is not in the circuit so that reverse rotation takes place at full speed until contacts 66 and 67 open.

For manual operation, a control knob 12 may be coupled to the gear 43. As the pinion 42 is disengaged from the gear 39, operation of the opinion 42 by the gear 43 resulting from operation of the manual control knob 12 will not be transferred through the gear 39 backward along the gear train. Accordingly, manual tuning will cause operation of the disc 28 and the carriage 25, but will not cause movement of a part of the gear train and the tuning will therefore be made much easier.

Fig. 2 also illustrates push button operation of the tuner. The push buttons 15 are illustrated as individually connected to contacts 70. Cooperating with these contacts is a contact arm 71 which is pivoted at point 72 and is made to sweep through an angle as the carriage moves by the lug 73 which is connected to the carriage 25. The contacts 70 are normally positioned out of the path of the arm 71, but when a push button is depressed, the contact associated therewith is positioned in the path of the arm 71. This is illustrated by contact **70*a* which is shown in actuated position. The push buttons 70** are mechanically interlocked with each other and with the tuning bar 14 and actuation of any push button or the tuning bar closes contacts 50 and 51 previously mentioned. The push buttons are also connected to contacts 75 which are broken when any push button is depressed. This opens the ground from the cathodes of tubes 21 and 22 so that these tubes will not function to amplify a received carrier wave. However, when the arm 71 engages a contact 70, this ground is reestablished through the actuated contact 70 and the contact arm. Accordingly, when the carriage reaches this predetermined position, the receiver is rendered operative to provide a trigger voltage in response to a carrier wave, and when a carrier wave is then received, this voltage will be provided and applied to the control relay to stop the tuner in the usual manner.

Figures 3, 4:
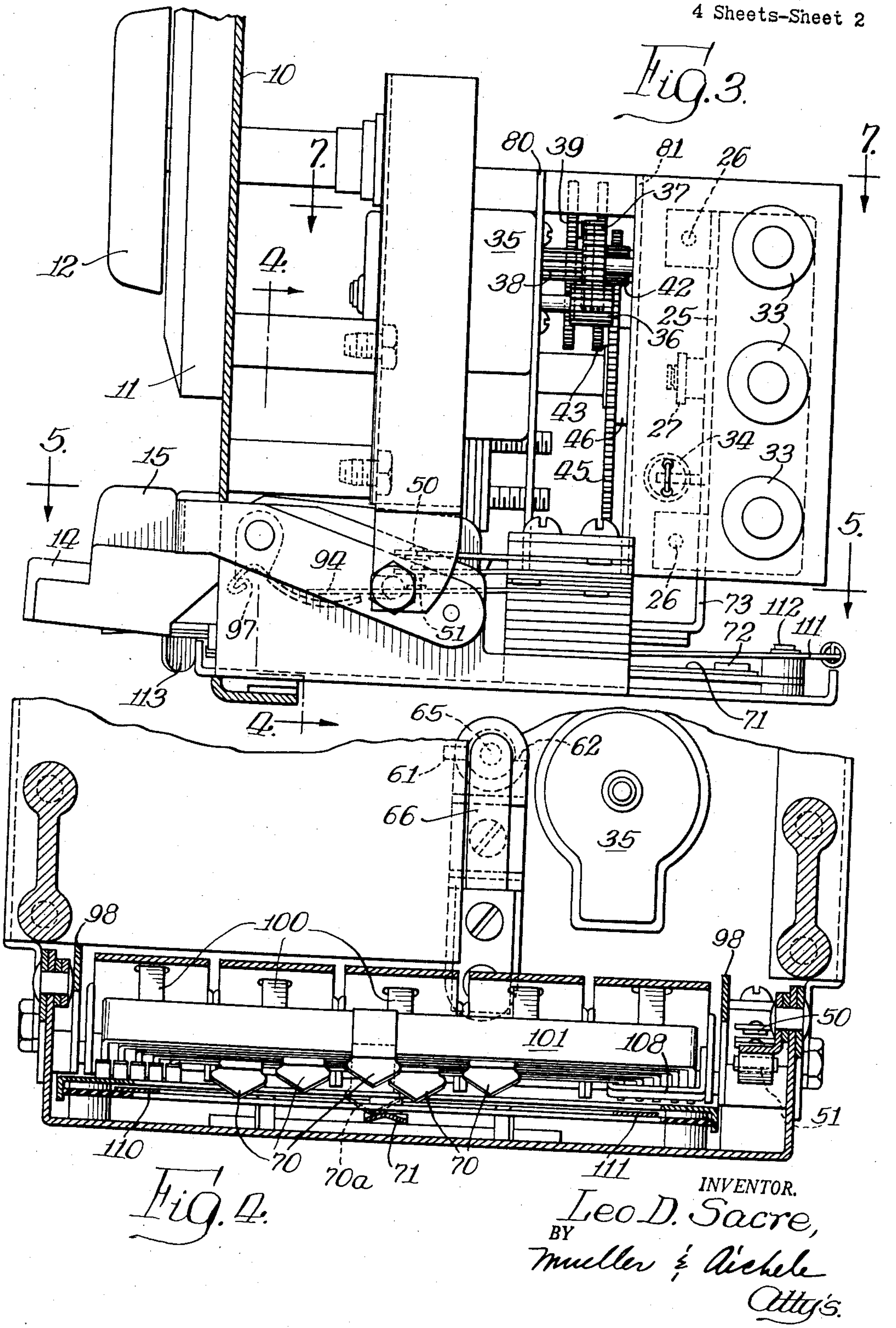
Fig. 3 is a side cross-sectional view along the lines 3—3 of Fig. 1.
Fig. 4 is a front cross-sectional view along the lines 4—4 of Fig. 3.
Figures 7, 8:
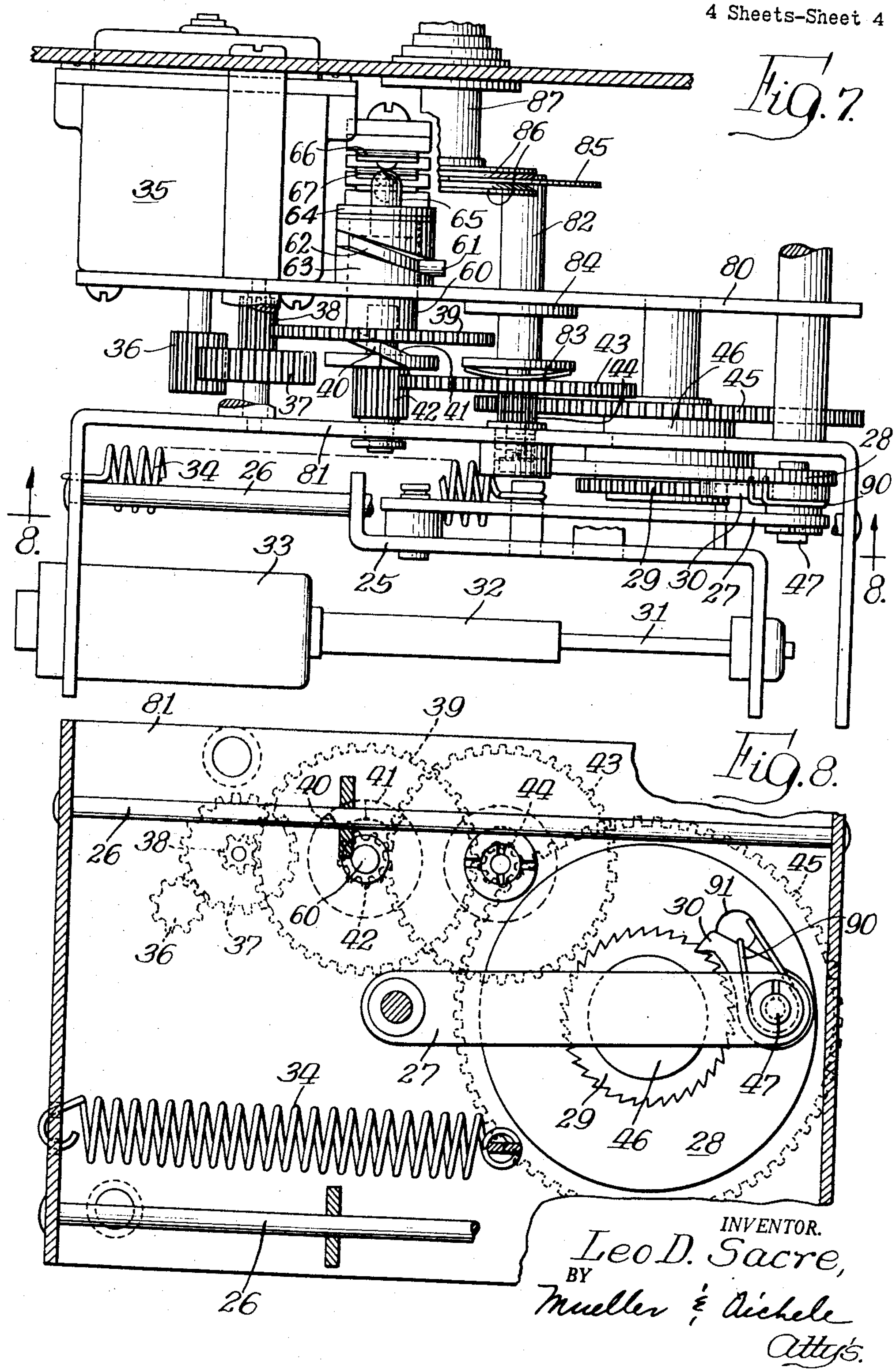
Fig. 7 is a cross-sectional view along the lines 7—7 of Fig. 3 showing the gear structure.
Fig. 8 is a cross-sectional view along the lines 8—8 of Fig. 7 showing the gear structure.

In Figs. 3, 7 and 8 there is shown one embodiment of the structure of the gear train, clutch and carriage structure. The various components are given the same numbers as in Fig. 2 and the arrangement is sufficiently similar that it is believed that the corresponding parts will be obvious so that further description of the mechanical construction will not be necessary. It will be apparent from Fig. 7 that the gear 39 is supported on mounting plate 80, and the gear 42 is supported on mounting member 81. This permits independent movement of the gears 39 and 42 to break the gear train as previously described. For manual operation, the gear 43 is driven by shaft 82 which is connected to the gear 43 through a friction clutch structure 83. The disc 84 on the shaft 82 bears against the mounting plate 80 to provide friction so that rotation of the gear 43 will not cause rotation of the shaft 82, but rotation of the shaft 82 will be transferred through the clutch 83 to the gear 43. The shaft 82 may be driven by a frictional coupling including disc 85 positioned between plates 86 secured to shaft 87. The shaft 87 may be driven by the manual control knob 12 shown in Figs. 1 and 2.

Figs. 7 and 8 show in more detail the connection of the gear train to the carriage 25 through the link 27, pawl 30 and toothed wheel 29. As previously stated, the disc 28 moves freely on the shaft 46, and link 27 and pawl 30 are connected to the disc 28 by pivot 47. As shown in Fig. 8, the pawl 30 is held in engagement with the wheel 29 by a spring 90 which is held in position in an opening 91 in the disc 28. The toothed wheel 29 rotates clockwise, and when the engaging portion of the pawl moves below center, the pawl will become disengaged so that the carriage may be moved to the right by the action of the spring 34.

The structure of the push button and tuning bar mechanism is best shown in Figs. 3, 4, 5 and 6. This mechanism is provided as a unit which can be separately assembled and used with various different tuning structures. The push buttons and tuning bar are all mounted for pivotal movement about the axis 95. It is to be pointed out, however, that other constructions, such as a plunger type motion of the tuning bar and push buttons could be provided if desired. The tuning bar 14 is spring biased and returns as soon as released. The push buttons are also spring biased by springs 93. The tuning bar and the push buttons are mechanically interlocked so that operation of the tuning bar releases any push button which has been depressed. This action is provided by the pivoted latch 97 which is moved to a position to release an actuated push button by the levers 98 which support the tuning bar 14. The push buttons are held in actuated position by engagement of the hook on the downwardly extending lugs 99 with the latch 97. The latch is moved out of engagement by the lug on another button as it is depressed or by the tuning bar. The latch 97 includes a projecting arm 96 which engages contact arm 94 to close contacts 50 and 51. Accordingly, the switch contacts 50 and 51 are closed by actuation of the push buttons as well as the latching bar as previously described. However, when the push buttons are depressed, the contacts 50 and 51 are only momentarily closed as the latch 97 allows the actuated button to return to a sufficient extent to break the contacts 50 and 51. The contact arm 94 also serves as a spring which operates through arm 96 to return the latch 97 and the latching bar 14 to normal positions.

Figures 5, 6:
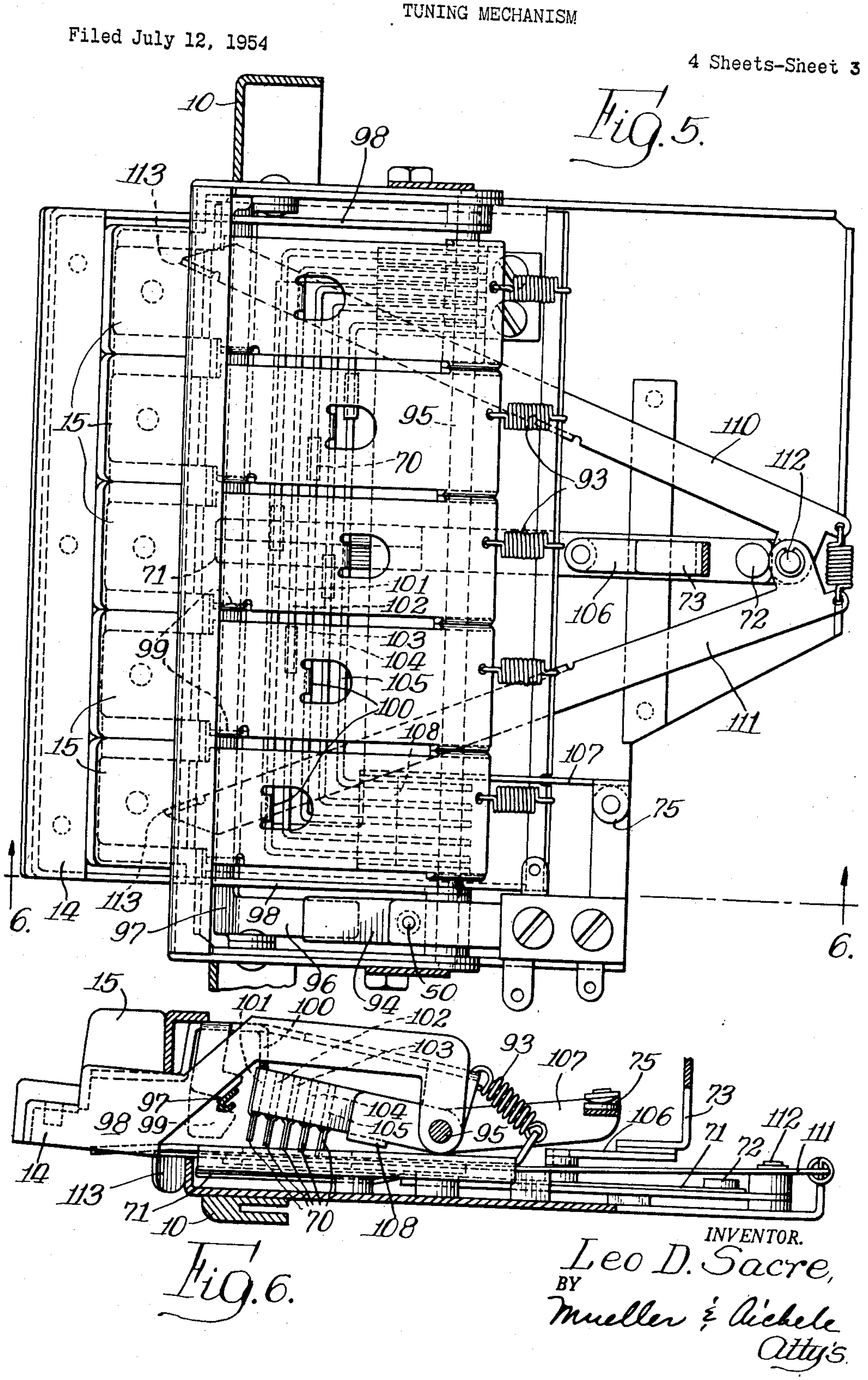
Fig. 5 is a cross-sectional view along the lines 5—5 of Fig. 3 illustrating the push button operating structure.
Fig. 6 is a cross-sectional view along the lines 5—5 of Fig. 3 further illustrating the push button structure.

As best shown in Figs. 4, 5 and 6, each of the push buttons includes a downwardly extending punched out portion 100 which engages one of the U-shaped brackets 101, 102, 103, 104 and 105 which are also pivoted on axis 95 and are individually associated with the push buttons. When a push button is depressed, the associated bracket will also be depressed. Slideably mounted on each arm is a contact 70 previously described. Pivotally mounted below the contacts 70 is the contact arm 71 previously described which swings as the carriage moves back and forth. The bracket 73 on the carriage is connected to the contact arm 71 through linkage 106. Accordingly, as the carriage moves, the arm 71 swings below the brackets, and the contact 70 on a bracket which has been depressed will be engaged thereby, as shown at 70a in Fig. 4. When any one of the U-shaped brackets is operated, the lever arm 107 is also rotated to open the contacts 75, the function of which has been previously described. This action takes place because the portion 108 connected to the lever arm 107 extends under the brackets 101, 102, 103, 104 and 105 and is moved thereby.

In order to set the position of the contacts 70 so they will cause the tuner to stop at desired stations (predetermined frequencies), a scissors-like structure is provided including pivoted arms 110 and 111. These arms are pivoted at 112 which also forms the pivot for the contact arm 71. To set any one of the contacts 70, the tuner should be set at a desired station whereby the arm 71 will be moved by the carriage to a predetermined position. Then the arms 110 and 111 may be pivoted together by movement of the down-turned ends 113 thereof inwardly until they are at positions adjacent the contact arm 71. This will move the contact 70 of a push button which has been actuated to a position in engagement with the contact arm 71. Accordingly, the push button which has been actuated will be set for the station which is turned in when the position of the contact 70 is adjusted. The remaining contacts 70 may be similarly positioned by tuning in desired stations, actuating a push button and then pivoting the arms 110 and 111 together so that the contact 70 of the actuated push button is moved to engage the contact arm.

Considering now the operation of the tuner, when the tuning bar 14 is depressed, the latch 97 moves to close contacts 50 and 51. This completes the energizing circuit to the motor 35 and the motor operates through the gear train which moves link 27 and pawl 30 to drive the tuner carriage 25. The tuner, therefore, will sweep through the frequencies of the broadcast band. When the carriage reaches the end of the tuning range, the pawl 30 will release and spring 34 will move the carriage to the other end of the tuning range.

The trigger circuit will provide a control voltage when a station is received to actuate relay 55. This breaks the circuit to the motor and establishes a connection for reverse rotation of the motor. The gear train driven by the motor includes projections 40 and 41 which disengage when the motor reverses and the driving connection is thereby broken. The reverse driving of the motor causes the shaft 60 to move axially, through action of the pin 61 and spiral slot 62, to break contacts 66 and 67. This opens the motor circuit and completes the tuning operation.

When one of the push buttons 15 is operated, this will also operate the latch 97 to close contacts 50 and 51 and start the motor 35. Operation of any push button will also break contacts 75 to disable the receiver circuit so that the control voltage is not produced by the trigger circuit. However, the contact 70 coupled to the actuated push button will be in a position to engage conducting arm 71. Accordingly, when arm 71 moves into engagement with the contact 70, the receiver circuit is reestablished through contacts 70 and 71, and the trigger circuit will operate to provide the control voltage. The signal seeking circuit will therefore be actuated only when the tuner is at a frequency close to the frequency associated with the position of the contact 70. Accordingly, in this position the signal seeking circuit will operate to stop the tuner when the signal is received in the same manner as when actuated by the tuning bar 14.

It is therefore seen that the tuner described provides automatic motor operated signal seeking operation over a range of frequencies such as the broadcast band. The system is highly advantageous in that because of the gear ratio provided, the tuning elements are stopped quickly and accurately. Also, at the end of each automatic tuning operation the gear train between the motor and the tuning mechanism proper is disengaged to thereby facilitate manual tuning. This eliminates the clutch arrangement normally required in systems of this type.

The structure provides for push button control of preset stations or frequencies, with such stations being accurately tuned by the signal seeking mechanism. The overall structure is relatively simple and may be inexpensively constructed since most of the parts can be merely punched out. The relation of the parts is not highly critical so that assembly thereof may be easily accomplished. The gears may be punched out of metal or may be made of synthetic material such as nylon if desired. This permits molding of the gears and also results in silent operation thereof. As previously stated, the push button and tuning mechanism may be provided as a unit to facilitate manufacture thereof and to provide interchangeability. The buttons and bar are positioned for easy operation and the downward movement required is an easy natural movement. The structure for setting the push buttons makes it possible to reset the buttons very quickly and easily. No additional tools such as screwdrivers or the like are necessary and no special skill is required to perform this operation.

Although one embodiment of the invention has been disclosed which is illustrative thereof, it is obvious that various changes and modifications can be made within the intended scope of the invention as defined in the appended claims.

What is claimed is:

1. A motor operated tuner for a radio receiver adapted to provide tuning over a range of frequencies and to stop the tuning in response to a predetermined signal, said tuner including in combination, direct current supply means, switch means connected to said supply means, direct current motor means, relay means for connecting said motor means to said switch means and including reversible conections for reversing the polarity of the current applied thereto, said relay means normally connecting said motor means for causing rotation thereof in one direction and operating in response to the signal to connect said motor means for rotation in the reverse direction, movable tuner means for the receiver, gear means interconnecting said motor means and said tuner means for causing said tuner means to sweep the frequency range in response to rotation of said motor, said gear means including a link immediately disengageable in response to reverse rotation of said motor means, and means connected to said gear means between said motor means and said link operating in response to reverse rotation of said motor to operate said switch means to break the connection from said supply means to said relay means and thereby deenergize said motor means.

2. A motor operated tuner for a radio receiver adapted to provide tuning over a range of frequencies and to stop the tuning in response to a predetermined signal, said tuner including in combination, current supply means, switch means connected to said supply means, motor means, relay means including contacts normally closed for connecting said motor to said supply means and operating in response to the signal to open said contacts, longitudinally movable tuner means for the receiver, driving means interconnecting said motor means and said tuner means, said driving means including a toothed wheel coupled to said motor means and a pawl adapted to engage said toothed wheel and coupled to said tuner means for causing movement of said tuner means in one direction so that said tuner means sweeps the frequency range in response to rotation of said motor means, said pawl being disengaged when said tuner means reaches a first position corresponding to one end of the frequency range, and spring means for returning said tuner means from said first position to a second position corresponding to the other end of the frequency range, with said pawl engaging said toothed wheel when said tuner means reaches said second position so that said tuner means is again driven by said motor means to said first position.

3. A motor operated tuner for a radio receiver adapted to provide tuning over a range of frequencies and to stop the tuning in response to a predetermined signal, said tuner including in combination, direct current supply means, switch means connected to said supply means, direct current motor means, relay means for connecting said motor means to said switch means and including reversible connections for reversing the polarity of the current applied thereto, said relay means normally connecting said motor means for causing rotation thereof in one direction and operating in response to the signal to connect said motor means for rotation in the reverse direction, longitudinally movable tuner means for the receiver, driving means selectively interconnecting said motor means and said tuner means for causing movement of said tuner means in one direction so that said tuner means sweeps the frequency range in response to rotation of said motor means, said driving means including a portion immediately disengaged in response to reverse movement of said motor and a portion disengaged when said tuner means reaches a first position corresponding to one end of the frequency range, and spring means for returning said tuner means from said first position to a second position corresponding to the other end of the frequency range, with said driving means being engaged when said tuner means reaches said second position for again driving said tuner means in said one direction.

4. A motor operated tuner for a radio receiver adapted to provide tuning over a range of frequencies and to stop the tuning in response to a predetermined signal, said tuner including in combination, direct current supply means, switch means connected to said supply means, direct current motor means, relay means for connecting said motor means to said switch means and including reversible connections for reversing the polarity of the current applied thereto, said relay means normally connecting said motor means for causing rotation thereof in one direction and operating in response to the signal to connect said motor means for rotation in the reverse direction, longitudinally movable tuner means for the receiver, driving means interconnecting said motor means and said tuner means including gear means and a toothed wheel and pawl for causing movement of said tuner means in one direction so that said tuner means sweeps the frequency range in response to rotation of said motor means, said gear means including a portion immediately disengageable in response to reverse rotation of said motor means to break the driving connection therethrough, said gear means also including means operating in response to predetermined reverse rotation of said motor means to operate said switch means and deenergize said motor means, said pawl being disengaged when said tuner means reaches a first position corresponding to one end of the frequency range, and spring means for returning said tuner means from said first position to a second position corresponding to the other end of the frequency range, with said pawl engaging said toothed wheel when said tuner means reaches said second position for again driving said tuner means in said one direction.

5. A motor operated tuner for a radio receiver adapted to provide tuning over a range of frequencies and to stop the tuning in response to a predetermined signal, said tuner including in combination, reversible electric motor means, electric current supply means, switch means connected to said current supply means, relay means for connecting said motor means to said switch means and including connections for reversing the direction of rotation of said motor means, said relay means normally connecting said motor means for causing rotation thereof in the forward direction and operating in response to the signal to connect said motor means for rotation in the reverse direction, actuating means for operating said switch means to energize said motor means, movable tuner means for the receiver, and gear means interconnecting said motor means and said tuner means for causing said tuner means to sweep the frequency range in response to rotation of said motor means, said gear means including a portion immediately disengageable in response to reverse rotation of said motor means, said switch means including a portion coupled to said disengageable portion of said gear means to hold said motor means energized during forward rotation thereof and to operate said switch means in response to reverse rotation of said motor means to break the connection from said supply means to said relay means and thereby de-energize said motor means.

6. A motor operated tuner for a radio receiver adapted to provide tuning over a range of frequencies and to stop the tuning in response to a predetermined signal, said tuner including in combination, reversible electric motor means, electric current supply means, switch means connected to said current supply means, relay means for connecting said motor means to said switch means and including connections for reversing the direction of rotation of said motor means, said relay means normally connecting said motor means for causing rotation thereof in the forward direction and operating in response to the signal to connect said motor means for rotation in the reverse direction, actuating means for operating said switch means to energize said motor means, said actuating means energizing said relay means so that said motor means is connected for rotation in the forward direction, movable tuner means for the receiver, and gear means interconnecting said motor means and said tuner means for causing said tuner means to sweep the frequency range in response to rotation of said motor means, said gear means including a portion disengageable in response to reverse rotation of said motor means, said switch means including a portion coupled to said disengageable portion of said gear means to hold said motor means energized during forward rotation thereof and to operate said switch means in response to reverse rotation of said motor means to break the connection from said supply means to said relay means and thereby de-energize said motor means.

7. A motor operated tuner for a radio receiver adapted to provide tuning over a range of frequencies and to stop the tuning in response to a predetermined signal, said tuner including in combination, electric current supply means, switch means connected to said supply means, reversible electric motor means, relay means for connecting said motor means to said switch means and including connections for reversing the direction of rotation of said motor means, said relay means normally connecting said motor means for causing rotation thereof in one direction and operating in response to the signal to connect said motor means for rotation in the reverse direction, movable tuner means for the receiver, gear means interconnecting said motor means and said tuner means for causing said tuner means to sweep the frequency range in response to rotation of said motor means, said gear means including a link disengageable in response to reverse rotation of said motor means, manual tuning means connected to said gear means between said link and said tuner means for operating said tuner means, and means connected to said gear means between said motor means and said link operating in response to reverse rotation of said motor means to operate said switch means to break the connection from said supply means to said relay means and thereby deenergize said motor means.

8. A motor operated tuner for a radio receiver adapted to provide tuning over a range of frequencies and to stop the tuning in response to a predetermined signal including in combination, direct current supply means, switch means connected to said supply means, direct current motor means, relay means for connecting said motor means to said switch means and including reversible connections for reversing the polarity of the current applied thereto, said relay means normally connecting said motor means for causing rotation thereof in one direction and operating in response to the signal to connect said motor means for rotation in the reverse direction, longitudinally movable tuner means for the receiver, driving means interconnecting said motor means and said tuner means for causing said tuner means to move in one direction and sweep the frequency range in response to rotation of said motor means, said driving means including gear means having a link disengageable in response to reverse rotation of said motor means, and clutch means connecting said gear means and said tuner means which is disengaged when said tuner means reaches one end of the frequency range, spring means for returning said tuner means from said one end of the frequency range to the other end thereof, with said clutch being engaged to again drive said tuner means in said one direction when said other end of the range is reached, manual tuning means connected to said gear means between said link and said tuner means for operating said tuner means, and means connected to said gear means between said motor means and said link operating in response to reverse rotation of said motor means to operate said switch means to break the connection from said supply means to said relay means and thereby deenergize said motor means.

9. A motor operated tuner for a radio receiver adapted to provide tuning over a range of frequencies and to stop the tuning in response to a predetermined signal including in combination, electric current supply means, switch means connected to said supply means, reversible electric motor means, relay means for connecting said motor means to said switch means and including connections for reversing the direction of rotation of said motor means, said relay means normally connecting said motor means for causing rotation thereof in one direction and operating in response to the signal to connect said motor means for rotation in the reverse direction, movable tuner means for the receiver, gear means interconnecting said motor means and said tuner means for causing said tuner means to sweep the frequency range in response to rotation of said motor means, said gear means including a link immediately disengageable in response to reverse rotation of said motor means to interrupt movement of said tuner means by said motor means, and manual tuning means connected to said gear means between said link and said tuner means for operating said tuner means.

10. A motor operated tuner for a radio receiver adapted to provide tuning over a range of frequencies and to stop the tuning in response to a predetermined signal including in combination, direct current supply means, switch means connected to said supply means, direct current motor means, relay means for connecting said motor means to said switch means and including reversible connections for reversing the polarity of the current applied thereto, said relay means normally connecting said motor means for causing rotation thereof in one direction and operating in response to the signal to connect said motor means for rotation in the reverse direction movable tuner means for the receiver, gear means interconnecting said motor means and said tuner means for causing said tuner means to sweep the frequency range in response to rotation of said motor means, said gear means including a link immediately disengageable in response to reverse rotation of said motor means to disconnect said tuner means from said motor means, manual tuning means, and friction clutch means connecting said manual tuning means to said gear means between said disengageable link and said tuner means, said friction clutch transferring movement of said manual tuning means to said gear means for operating said tuner means, and preventing movement of said manual tuning means by said gear means.

11. A motor operated tuner for a radio receiver adapted to provide tuning over a range of frequencies and to stop the tuning in response to a predetermined signal including in combination, direct current supply means, switch means connected to said supply means, direct current motor means, relay means for connecting said motor means to said switch means and including reversible connections for reversing the polarity of the current applied thereto, said relay means normally connecting said motor means for causing rotation thereof in one direction and operating in response to the signal to connect said motor means for rotation in the reverse direction, movable tuner means for the receiver, gear means interconnecting said motor means and said tuner means for causing said tuner means to sweep the frequency range in response to rotation of said motor means, said gear means including first and second coaxial gears having projections adapted to engage for driving said second gear from said first gear, said first gear being mounted on a shaft adapted to move axially in response to reverse rotation of said first gear so that said projections are spaced from each other and said second gear is not driven by said first gear, and manual tuning means connected to said gear means between said second gear and said tuner means for operating said tuner means.

12. A motor operated tuner for a radio receiver adapted to provide tuning over a range of frequencies and to stop the tuning in response to a predetermined signal including in combination, direct current supply means, switch means connected to said supply means, direct current motor means, relay means for connecting said motor means to said switch means and including reversible connections for reversing the polarity of the current applied thereto, said relay means normally connecting said motor means for causing rotation thereof in one direction and operating in response to the signal to connect said motor means for rotation in the reverse direction, movable tuner means for the receiver, gear means interconnecting said motor means and said tuner means for causing said tuner means to sweep the frequency range in response to rotation of said motor means, said gear means including first and second coaxial gears having projections adapted to engage for driving said second gear from said first gear, said first gear being mounted on a shaft adapted to move axially in response to reverse rotation of said first gear so that said projections are spaced from each other and said second gear is not driven by said first gear, means coupled to said shaft for operating said switch means in response to longitudinal movement of said shaft to deenergize said motor means after predetermined reverse rotation thereof, and manual tuning means connected to said gear means between said second gear and said tuner means for operating said tuner means.

13. A motor operated tuner for a radio receiver adapted to provide tuning over a range of frequencies and to stop the tuning in response to a predetermined signal including in combination, direct current supply means, switch means connected to said supply means, direct current motor means, relay means for connecting said motor means to said switch means and including reversible connections for reversing the polarity of the current applied thereto, said relay means normally connecting said motor means for causing rotation thereof in one direction and operating in response to the signal to connect said motor means for rotation in the reverse direction, movable tuner means for the receiver, gear means interconnecting said motor means and said tuner means for causing said tuner means to sweep the frequency range in response to rotation of said motor means, said gear means including first and second coaxial gears having projections adapted to engage for driving said second gear from said first gear, said first gear being mounted on a shaft mounted for axial movement, said shaft having a pin thereof, a sleeve about said shaft having a spiral slot therein, said pin being positioned in said slot to move said shaft axially in response to reverse rotation of said first gear so that said projections are spaced from each other and said second gear is not driven by said first gear, and manual tuning means connected to said gear means between said second gear and said tuner means for operating said tuner means.

14. A motor operated tuner for a radio receiver adapted to provide tuning over a range of frequencies and to stop the tuning in response to a predetermined signal, said turner including in combination, direct current supply means, first switch means connected to said supply means, direct current motor means, relay means for connecting said motor means to said switch means and including reversible connections for reversing the polarity of the current applied thereto, said relay means normally connecting said motor means for causing rotation thereof in the forward direction and operating in response to the signal to connect said motor means for rotation in the reverse direction, movable tuner means for the receiver, gear means interconnecting said motor means and said tuner means for causing said tuner means to sweep the frequency range in response to rotation of said motor, said gear means including a link disengageable in response to reverse rotation of said motor means, and circuit means bridged across said first switch means including second switch means coupled to said gear means between said motor means and said link, said second switch means being closed to energize said motor means in response to rotation of said motor means in said forward direction, and opening in response to reverse rotation of said motor means to break the connection from said supply means to said relay means and thereby deenergize said motor means, said circuit means including impedance means in series therewith so that said motor means operates at lower speed when energized through said second switch means than when energized through said first switch means.

15. A motor operated tuner for a radio receiver adapted to provide tuning over a range of frequencies and to stop the tuning in response to a predetermined signal, said tuner including in combination, direct current supply means, switch means connected to said supply means, direct current motor means, relay means for connecting said motor means to said switch means and including reversible connections for reversing the polarity of the current applied thereto, said relay means including normally connected contacts for energizing said motor means for causing rotation thereof in one direction and additional contacts which are closed in response to the signal to connect said motor means for rotation in the reverse direction, impedance means connected in series relation with said normally connected contacts for causing said motor to operate slower in said forward tuning direction than in said reverse direction, movable tuner means for the receiver, gear means interconnecting said motor means and said tuner means for causing said tuner means to sweep the frequency range in response to rotation of said motor, said gear means including a link disengageable in response to reverse rotation of said motor means, and means connected to said gear means between said motor means and said link operating in response to reverse rotation of said motor to operate said switch means to break the connection from said supply means to said relay means and thereby deenergize said motor means.

16. A motor operated tuner for a radio receiver adapted to provide tuning over a range of frequencies and to stop the tuning in response to the reception of a carrier wave, said tuner including in combination, control means for providing a control signal when a carrier wave is received, direct current supply means, switch means connected to said supply means, direct current motor means, relay means for connecting said motor means to said switch means and including reversible connections for reversing the polarity of the current applied thereto, said relay means normally connecting said motor means for causing rotation thereof in the forward direction and operating in response to said control signal to connect said motor means for rotation in the reverse direction, a plurality of push button units each including a contact normally held in inactive position and moved to active position as the unit is operated, means actuated by operation of any one of said push button units for operating said switch means to momentarily energize said motor means and for disabling said control means, movable tuner means for the receiver, driving means interconnecting said motor means and said tuner means for causing said tuner means to sweep the frequency range in response to rotation of said motor means, and movable contact means coupled to said tuner means and movable past said contacts of said push button units to engage a contact in active position, said contact means and a contact engaged thereby providing a circuit for activating said control means so that a control signal is produced in response to the next carrier wave received and said relay operates to reverse the direction of rotation of said motor means, said driving means including a portion disengageable in response to reverse rotation of said motor means, said switch means including a portion coupled to said disengageable portion of said driving means to hold said switch means closed and thereby energize said motor means during forward rotation thereof, and to open said switch means in response to predetermined reverse rotation of said motor means to break the connection from said supply means to said relay means and thereby deenergize said motor means.

17. A motor operated tuner for a radio receiver adapted to provide tuning over a range of frequencies and to stop the tuning in response to the reception of a carrier wave, said tuner including in combination, control means for providing a control signal when a carrier wave is received, direct current supply means, switch means connected to said supply means, direct current motor means, relay means for connecting said motor means to said switch means and including reversible connections for reversing the polarity of the current applied thereto, said relay means normally connecting said motor means for causing rotation thereof in the forward direction and operating in response to said control signal to connect said motor means for rotation in the reverse direction, a plurality of push button units each including a contact normally held in inactive position and moved to active position as the unit is operated, means actuated by operation of any one of said push button units for operating said switch means to momentarily energize said motor means and for disabling said control means, longitudinally movable tuner means for the receiver, gear means connected to said motor means, mechanical means connecting said gear means to said tuner means for causing said tuner means to sweep the frequency range in one direction in response to rotation of said motor means, said mechanical means being disengaged when said tuning means reaches one end of the frequency range, spring means for returning said tuning means to the other end of the frequency range, and a movable contact arm coupled to said tuner means and movable past said contacts of said push button units to engage a contact in active position, said contact arm and a contact engaged thereby providing a circuit for activating said control means so that a control signal is produced in response to the next carrier wave received and said relay is operated to reverse the rotation of said motor means, said gear means including a portion disengageable in response to reverse rotation of said motor means, said switch means including a portion coupled to said disengageable portion of said gear means to hold said motor means energized during forward rotation thereof and to operate said switch means in response to reverse rotation of said motor means to break the connection from said supply means to said relay means and thereby deenergize said motor means.

18. A motor operated tuner for a radio receiver adapted to provide tuning over a range of frequencies and to stop the tuning in response to a carrier wave, said tuner including in combination, control means for providing a control signal when a carrier wave is received, direct current supply means, switch means connected to said supply means, direct current motor means, relay means for connecting said motor means to said switch means and including reversible connections for reversing the polarity of the current applied thereto, said relay means normally connecting said motor means for causing rotation thereof in the forward direction and operating in response to said control signal to connect said motor means for rotation in the reverse direction, an actuating element, a plurality of push button elements each including a contact normally held in inactive position and moved to active position as the push button element is operated, means interlocking said actuating element and said push button elements, means actuated by operation of any one of said elements for operating said switch means to energize said motor means and for preventing operation of said relay means, means actuated by operation of any one of said push button elements for disabling said control means, movable tuner means for the receiver, driving means interconnecting said motor means and said tuner means for causing said tuner means to sweep the frequency range in response to rotation of said motor means, a movable contact arm coupled to said tuner means and movable past said contacts of said push button units to engage a contact in active position, said contact arm and a contact engaged thereby providing a circuit for activating said control means so that a control signal is produced in response to the next carrier wave received and said relay is operated to reverse the rotation of said motor means, said driving means including a portion disengageable in response to reverse rotation of said motor means, said switch means including a portion coupled to said disengageable portion of said gear means to hold said motor means energized during forward rotation thereof and to operate said switch means in response to reverse rotation of said motor means to break the connection from said supply means to said relay means and thereby deenergize said motor means.

19. A motor operated tuner for a radio receiver adapted to provide tuning over a range of frequencies and to stop the tuning in response to the reception of a carrier wave, said tuner including in combination, control means for providing a control signal when a carrier wave is received, direct current supply means, direct current motor means, switch means connected to said supply means, relay means for connecting said motor means to said switch means and including reversible connections for reversing the polarity of the current applied thereto, said relay means normally connecting said motor means for causing rotation thereof in the forward direction and operating in response to said control signal to connect said motor means for rotation in the reverse direction, an actuating element, a plurality of push button elements each including a contact normally held in inactive position and moved to active position as the push button element is operated, means interlocking said actuating element and said push button elements, means actuated by operation of any one of said elements for operating said switch means to energize said motor means and for preventing operation of said relay means, means actuated by operation of any one of said push button elements for disabling said control means, movable tuner means for the receiver, driving means interconnecting said motor means and said tuner means for causing said tuner means to sweep the frequency range in response to rotation of said motor means, a movable contact arm coupled to said tuner means and movable past said contacts of said push button units to engage a contact in active position, said contact arm and a contact engaged thereby providing a circuit for activating said control means so that a control signal is produced in response to the next carrier wave received and said relay is operated to reverse the rotation of said motor means, said driving means including a portion disengageable in response to reverse rotation of said motor means, and manual tuning means coupled to said driving means between said disengageable portion thereof and said tuner means.

References Cited in the file of this patent

UNITED STATES PATENTS

| | | |
|---|---|---|
| 1,700,281 | Burnes et al. | Jan. 29, 1929 |
| 2,262,218 | Andrews | Nov. 11, 1941 |
| 2,499,573 | Dunn | Mar. 7, 1950 |
| 2,499,967 | Nicholson | Mar. 7, 1950 |
| 2,501,003 | Pifer | Mar. 21, 1950 |
| 2,512,714 | Carlzen | June 27, 1950 |
| 2,525,442 | Bischoff | Oct. 10, 1950 |
| 2,529,677 | Case | Nov. 14, 1950 |
| 2,549,870 | Wallace | Apr. 24, 1951 |
| 2,744,193 | Schwarz | Mar. 15, 1956 |
| 2,745,015 | Stillman | May 8, 1956 |